Patented Jan. 9, 1940

2,186,420

UNITED STATES PATENT OFFICE 2,186,420

PROCESS FOR THE MANUFACTURE OF MERCAPTOTHIAZOLES

Roger A. Mathes, Akron, Ohio, assignor to The B. F. Goodrich Company, New York, N. Y., a corporation of New York No Drawing. Application December 4, 1937, Serial No. 178,112

11 Claims. (Cl. 260—302)

This invention relates to an improved process for the manufacture of mercaptothiazoles.

The object of the invention is to provide a commercially useful method for the manufacture of mercaptothiazoles at an economical cost. This object is accomplished by an improved technique for carrying out the reaction, making possible, with an inexpensive process, the preparation of mercaptothiazoles of high purity and in good yields.

Methods described in the literature designate the use of alcohol or ether as a reaction diluent for the preparation of mercaptothiazoles by the interaction of ammonium dithiocarbamate and an organic compound containing the grouping

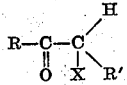

where R and R' are hydrogen or monovalent groups and X is halogen. The reaction may be represented in the following manner:

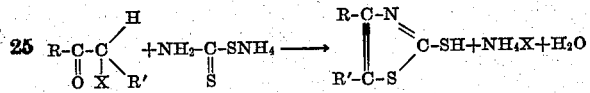

According to my invention, ammonium dithiocarbamate or an alkali salt of dithiocarbamic acid, suspended in an aliphatic hydrocarbon diluent is reacted with an organic compound of the general formula

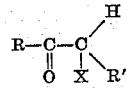

where R is a hydrocarbon group which may be joined to R'; R' is hydrogen or an alkyl group which may be joined to R; X is halogen. The aliphatic hydrocarbon diluent may be either saturated or unsaturated and either open straight or branched chain or cycloaliphatic. By the use of these aliphatic hydrocarbons as the reaction diluent the disadvantages in the use of alcohol or ether are overcome.

One of the most significant advantages in the use of a selected hydrocarbon as the reaction diluent is the formation of mercaptothiazoles as a suspension which may be filtered. When alcohol or ether is used as a diluent, the mercaptothiazoles are in solution. The recovery of mercaptothiazoles from an alcohol or ether solution is commercially disadvantageous. The purity of the mercaptothiazoles is improved by using a hydrocarbon diluent. Certain impurities present in the reactants and small amounts of impurities formed as the result of side reactions are soluble in the hydrocarbon diluent, and are retained in the filtrate.

Both saturated and unsaturated open chain aliphatic hydrocarbons, as for example, hexanes, heptanes, octanes, amylenes, diisobutylene, are suitable reaction diluents. Cycloaliphatic hydrocarbons such as cyclohexane, cyclopentane and methyl cyclohexane, are also useful diluents. The use of pure compounds or sharp distillation cuts is not necessary. Mixtures of these hydrocarbons, as gasolines of varying composition, are satisfactory diluents. Aromatic hydrocarbons when used alone are not suitable due to their solvent action on the mercaptothiazoles. However, when used in mixtures of hydrocarbons, such as gasolines, kerosenes, etc., the presence of certain proportions of aromatic hydrocarbons is not objectionable.

A halogenated organic compound of the general formula

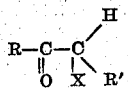

is added to a suspension of ammonium dithiocarbamate in the hydrocarbon diluent. The halogenated organic compound readily dissolves in the hydrocarbon. When agitation is started, heat is at times developed. In most instances, however, the application of heat is necessary to carry out the reaction. The formation of an insoluble intermediate compound, a dithiourethane, along with ammonium chloride, readily takes place. This intermediate, after a comparatively short period of heating with agitation, loses water and rearranges to form the mercaptothiazole.

Among the organic compounds which may be used in my process are the alpha halogenated ketones as chloroacetone, 1-chlorobutanone-2, 3-chlorobutanone-2, phenacyl chloride, p-methyl-phenacyl chloride, alpha chloro cyclohexanone, alpha chlorocyclopentanone.

This invention is not necessarily restricted to the use of alpha halogenated ketones. It is my intention to include other alpha halogenated organic compounds which react with ammonium dithiocarbamate suspended in a selected hydrocarbon diluent or with an alkali salt of dithiocarbamic acid to form mercaptothiazoles. Such a class of compounds are the alpha halogenated beta ketonic esters, as ethyl alpha chloroacetoacetate and methyl alpha chloroacetoacetate.

In certain of the specific examples which follow, the nomenclature depends upon the numbering of the cyclic atoms. In order to give a definite understanding of the position of the various atoms, the group is set forth as it is numbered:

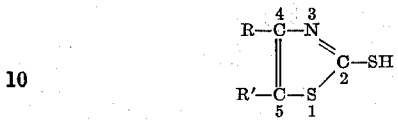

The reaction is preferably carried out in a reactor provided with an agitator, a reflux condenser and a device, as a steam jacket, for supplying heat.

One molecular proportion of ammonium dithiocarbamate is added to a sufficient volume of a selected hydrocarbon to give a suspension which may be stirred readily. To this suspension is added one molecular proportion of the alpha halogenated ketone. Agitation is started with the application of heat. After a relatively short period of time, the mercaptothiazoles are formed in suspension, with ammonium chloride. After continuing agitation a few minutes, the suspension is cooled, filtered and dried, then washed to remove ammonium chloride. The product is dried at room temperature. An alternative method is to add water directly to the reaction mixture, agitating to dissolve ammonium chloride, and filtering to recover the mercaptothiazoles. The layers in the filtrate, consisting of water and hydrocarbon, are separated and the hydrocarbon recovered for use in a subsequent preparation.

The reactants need not necessarily be used in equi-molecular proportions but an excess of either one may at times be desirable. Ammonium dithiocarbamate may be added to the solution of the alpha halogenated ketone in the hydrocarbon diluent if desired.

The hydrocarbon diluent may be purified by distillation when the impurities dissolved are sufficient to have an adverse effect upon the reaction.

The following examples describe the process more specifically, but it will be understood that the invention is not limited to these details. Wide variations both in the process and amounts of reactants are possible without materially affecting the results.

*Example 1.*—44 g. of ammonium dithiocarbamate are suspended in 270 cc. of high test gasoline in a reaction flask provided with an agitator and a reflux condenser. 42.6 g. of 1-chlorobutanone-2 are added.

Agitation is started, the 1-chlorobutanone-2 dissolves and the temperature quickly rises. The physical appearance of the suspension changes with the formation of the intermediate dithiourethane and ammonium chloride, which takes place within a few minutes. Agitation is continued with the application of heat and the reaction mixture allowed to gently reflux, at about 66° C., for a half hour. During this period of heating, water is split off and 2-mercapto 4-ethyl thiazole forms. The suspension is cooled, filtered and dried. The product is then washed with cold water to remove ammonium chloride and dried at room temperature.

*Example 2.*—The process essentially as described in Example 1, is carried out using 44 g. of ammonium dithiocarbamate, 42.6 g. of 1-chloro-butanone-2, and 270 cc. cyclohexane.

*Example 3.*—48.4 g. of ammonium dithiocarbamate are suspended in 250 cc. of high test gasoline in a reaction flask provided with an agitator and a reflux condenser. 42.6 g. of 3-chlorobutanone-2 are added and agitation is started.

The reactions, as outlined in Example 1, take place. 2-mercapto 4,5-dimethylthiazole forms as a suspension which is cooled, filtered and dried. The product is then washed with cold water to remove ammonium chloride and dried at room temperature.

*Example 4.*—48.4 g. of ammonium dithiocarbamate are suspended in 250 cc. of high test gasoline in a reaction flask provided with an agitator and a reflux condenser. 42.6 g. of a mixture of 1-chlorobutanone-2 and 3-chlorobutanone-2, as obtained by the chlorination of 2-butanone, are added and agitation is started.

The reaction is carried through the steps observed in Example 1. A mixture of 2-mercapto 4-ethylthiazole and 2-mercapto 4,5-dimethylthiazole forms as a suspension, which is cooled, filtered and dried. The product is then washed with cold water to remove ammonium chloride and is dried at room temperature.

*Example 5.*—36 g. of ammonium dithiocarbamate are suspended in 200 cc. of high test gasoline in a reaction flask provided with an agitator and a reflux condenser. 32 g. of a mixture of 1-chlorobutanone-2 and 3-chlorobutanone-2 are added, and agitation is started.

The various steps outlined in Example 1 are observed. A mixture of 2-mercapto 4-ethylthiazole and 2-mercapto 4,5-dimethylthiazole forms as a suspension. 100 cc. of cold water are added to the reaction mixture and agitation continued for a few minutes. The suspension is filtered, washed with cold water and dried at room temperature. The gasoline with water layers in the filtrate are separated, and the gasoline recovered.

*Example 6.*—36 g. of ammonium dithiocarbamate are suspended in 200 cc. of high test gasoline in a reaction flask provided with an agitator and a reflux condenser. 46.4 g. of phenacyl chloride are added, and agitation is started.

The phenacyl chloride dissolves readily. Heat is applied and the mixture is refluxed gently at about 66° C. for one hour. 2-mercapto 4-phenyl thiazole forms as a suspension which is cooled, filtered and dried. The product is then washed with cold water to remove ammonium chloride and is dried at room temperature.

From the data herein presented, the fact will be readily apparent that this invention constitutes a distinct improvement over previous processes for preparing mercaptothiazoles.

When a saturated or unsaturated open chain aliphatic hydrocarbon or a cycloaliphatic hydrocarbon is used as the reaction diluent, the mercaptothiazoles may be filtered from the hydrocarbon suspension, the loss due to solubility being negligible. Ammonium chloride formed in the reaction is readily removed by washing the dry product with water or by adding water directly to the reaction mixture. When alcohol or ether is used as the reaction diluent, the suspension consists of ammonium chloride while the mercaptothiazoles remain in solution. The recovery of the product from solution in a volatile solvent presents a troublesome problem on a commercial scale.

The purity of the crude reaction product using a selected hydrocarbon as the reaction diluent is such that for commercial use further purification is not necessary. In general, less pure products are obtained when alcohol or ether is used as the diluent. Impurities present in the reaction mixture are taken into solution by the hydrocarbon diluent and are retained in the filtrate.

Many hydrocarbons, as for example, gasoline, have a very favorable cost advantage over alcohol or ether.

The improvements in these important commercial aspects make possible the manufacture of mercaptothiazoles by my process at an economical cost.

I claim:

1. A process for the manufacture of mercaptothiazoles which comprises reacting an alkali metal salt or the ammonium salt of dithiocarbamic acid, suspended in a volatile, liquid aliphatic hydrocarbon diluent, with an alpha halogenated ketone of the general formula

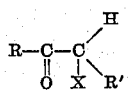

where R is a hydrocarbon group which may be joined to R'; R' is hydrogen or an alkyl group which may be joined to R; X is halogen.

2. A process for the manufacture of mercaptothiazoles which comprises reacting ammonium dithiocarbamate, suspended in a volatile, liquid aliphatic hydrocarbon diluent, with an alpha halogenated ketone of the general formula

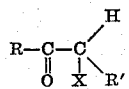

where R is a hydrocarbon group which may be joined to R'; R' is hydrogen or an alkyl group which may be joined to R; X is halogen.

3. A process for the manufacture of mercaptothiazoles which comprises reacting ammonium dithiocarbamate, suspended in gasoline, with an alpha halogenated ketone of the general formula

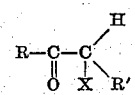

where R is a hydrocarbon group which may be joined to R'; R' is hydrogen or an alkyl group which may be joined to R; X is halogen.

4. A process for the manufacture of mercaptothiazoles which comprises reacting substantially equi-molecular proportions of ammonium dithiocarbamate, suspended in a volatile, liquid aliphatic hydrocarbon diluent, and an alpha halogenated ketone of the general formula

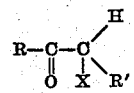

where R is a hydrocarbon group which may be joined to R'; R' is hydrogen or an alkyl group which may be joined to R; X is halogen.

5. A process for the manufacture of mercaptothiazoles which comprises reacting substantially equi-molecular proportions of ammonium dithiocarbamate, suspended in a volatile, liquid aliphatic hydrocarbon diluent, and an alpha halogenated ketone of the general formula

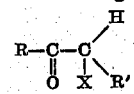

where R is a hydrocarbon group which may be joined to R'; R' is hydrogen or an alkyl group which may be joined to R; X is halogen, and removing the solid, suspended reaction product by filtration.

6. A process for the manufacture of mercaptoalkyl thiazoles which comprises reacting ammonium dithiocarbamate, suspended in a volatile, liquid aliphatic hydrocarbon diluent, with a mixture of 1-chlorobutanone-2 and 3-chlorobutanone-2.

7. A process for the manufacture of mercaptoalkylthiazoles which comprises reacting substantially equi-molecular proportions of ammonium dithiocarbamate, suspended in a volatile, liquid aliphatic hydrocarbon diluent, with a mixture of 1-chlorobutanone-2 and 3-chlorobutanone-2.

8. A process for the manufacture of mercaptoalkylthiazoles which comprises reacting substantially equi-molecular proportions of ammonium dithiocarbamate, suspended in a volatile, liquid aliphatic hydrocarbon diluent, with a mixture of 1-chlorobutanone-2 and 3-chlorobutanone-2, and removing the solid, suspended reaction product by filtration.

9. A process for the manufacture of mercaptoalkythiazoles which comprises reacting ammonium dithiocarbamate, suspended in gasoline, with a mixture of 1-chlorobutanone-2 and 3-chlorobutanone-2.

10. A process for the manufacture of a mercaptoalkylthiazole which comprises reacting ammonium dithiocarbamate, suspended in gasoline, with 3-chlorobutanone-2.

11. A process for the manufacture of a mercaptoalkylthiazole which comprises reacting ammonium dithiocarbamate, suspended in gasoline, with monochloroacetone.

ROGER A. MATHES.